US009489177B2

(12) United States Patent  
Koretz (10) Patent No.: US 9,489,177 B2  
(45) Date of Patent: Nov. 8, 2016

(54) METHODS FOR INTEGRATING AND MANAGING ONE OR MORE FEATURES IN AN APPLICATION AND SYSTEMS THEREOF

(75) Inventor: David A. Koretz, Pittsford, NY (US)

(73) Assignee: Adventive, Inc., Rochester, NY (US)

( * ) Notice: Subject to any disclaimer, the term of this patent is extended or adjusted under 35 U.S.C. 154(b) by 1048 days.

(21) Appl. No.: 12/072,274

(22) Filed: Feb. 25, 2008

(65) Prior Publication Data

US 2009/0217310 A1 Aug. 27, 2009

(51) Int. Cl.
*G06F 9/46* (2006.01)
*G06F 9/44* (2006.01)

(52) U.S. Cl.
CPC ....................................... *G06F 8/00* (2013.01)

(58) Field of Classification Search
None
See application file for complete search history.

(56) References Cited

U.S. PATENT DOCUMENTS

| | | | |
|---|---|---|---|
| 5,101,425 A | 3/1992 | Darland et al. |
| 5,210,789 A | 5/1993 | Jeffus et al. |
| 5,442,707 A | 8/1995 | Miyaji et al. |
| 5,509,074 A | 4/1996 | Choudhury et al. |
| 5,551,030 A * | 8/1996 | Linden et al. |
| 5,572,675 A * | 11/1996 | Bergler ......................... 719/328 |
| 5,615,268 A | 3/1997 | Bisbee et al. |
| 5,617,114 A | 4/1997 | Bier et al. |
| 5,640,577 A | 6/1997 | Scharmer |
| 5,694,563 A | 12/1997 | Belfiore et al. |
| 5,727,057 A | 3/1998 | Emery et al. |
| 5,737,424 A | 4/1998 | Elteto et al. |
| 5,774,668 A | 6/1998 | Choquier et al. |
| 5,790,790 A | 8/1998 | Smith et al. |
| 5,790,793 A | 8/1998 | Higley |
| 5,794,207 A | 8/1998 | Walker et al. |
| 5,794,259 A | 8/1998 | Kikinis |
| 5,802,518 A | 9/1998 | Karaev et al. |
| 5,805,811 A | 9/1998 | Pratt et al. |
| 5,835,896 A | 11/1998 | Fisher et al. |
| 5,845,281 A | 12/1998 | Benson et al. |
| 5,848,131 A | 12/1998 | Shaffer et al. |
| 5,848,161 A | 12/1998 | Luneau et al. |
| 5,855,006 A | 12/1998 | Huemoeller et al. |
| 5,870,470 A | 2/1999 | Johnson et al. |
| 5,870,544 A | 2/1999 | Curtis |
| 5,875,296 A | 2/1999 | Shi et al. |

(Continued)

OTHER PUBLICATIONS

International Search Report for International Patent Application No. PCT/US07/71521 (Jan. 7, 2008).

(Continued)

*Primary Examiner* — Umut Onat
(74) *Attorney, Agent, or Firm* — LeClairRyan, a Professional Corporation (57) ABSTRACT

A method, computer readable medium, and system for integrating and managing one or more features in an application includes obtaining data from at least one application provider system with at least one application and from one or more feature provider systems with one or more features. The obtained data is used to implement a programming interface between the syndication system and the application and the one or more features which can be integrated in the application. A selection of one or more of the features for integration in the application is received. The implementation of the programming interface between a syndication system and the application and the one or more selected features to be integrated in the application is generated. The generated implementation of the programming interface is provided to the application provider system with the application.

18 Claims, 5 Drawing Sheets

(56) References Cited

U.S. PATENT DOCUMENTS

| | | |
|---|---|---|
| 5,878,141 A | 3/1999 | Daly et al. |
| 5,890,138 A | 3/1999 | Godin et al. |
| 5,893,118 A | 4/1999 | Sondregger |
| 5,895,454 A | 4/1999 | Harrington |
| 5,897,622 A | 4/1999 | Blinn et al. |
| 5,899,980 A | 5/1999 | Wilf et al. |
| 5,905,973 A | 5/1999 | Yonezawa et al. |
| 5,917,491 A | 6/1999 | Bauserfeld |
| 5,940,807 A | 8/1999 | Purcell |
| 5,946,665 A | 8/1999 | Suzuki et al. |
| 5,948,040 A | 9/1999 | DeLorme et al. |
| 5,956,709 A | 9/1999 | Xue |
| 5,960,411 A | 9/1999 | Hartman et al. |
| 5,963,949 A | 10/1999 | Gupta et al. |
| 5,970,475 A | 10/1999 | Barnes et al. |
| 5,974,441 A | 10/1999 | Rogers et al. |
| 5,987,425 A | 11/1999 | Hartman et al. |
| 5,991,740 A | 11/1999 | Messer |
| 5,999,914 A | 12/1999 | Blinn et al. |
| 5,999,938 A | 12/1999 | Bliss et al. |
| 6,006,332 A | 12/1999 | Rabne et al. |
| 6,058,417 A | 5/2000 | Hess et al. |
| 6,065,046 A | 5/2000 | Feinberg et al. |
| 6,085,166 A | 7/2000 | Beckhardt et al. |
| 6,219,669 B1 | 4/2001 | Haff et al. |
| 6,266,651 B1 | 7/2001 | Woolston |
| 6,269,135 B1 | 7/2001 | Sander |
| 6,369,840 B1 | 4/2002 | Barnett et al. |
| 6,598,027 B1 | 7/2003 | Breen et al. |
| 6,601,092 B2 | 7/2003 | Itabashi et al. |
| 6,647,370 B1 | 11/2003 | Fu et al. |
| 6,658,473 B1 | 12/2003 | Block et al. |
| 6,763,335 B1 | 7/2004 | Nanbu et al. |
| 6,879,691 B1 | 4/2005 | Koretz |
| 6,938,256 B2 | 8/2005 | Deng et al. |
| 6,986,076 B1 | 1/2006 | Smith et al. |
| 6,993,572 B2 | 1/2006 | Ross, Jr. et al. |
| 7,124,101 B1 | 10/2006 | MiKurak |
| 7,430,732 B2* | 9/2008 | Cwalina et al. ............. 717/126 |
| 2001/0049613 A1 | 12/2001 | Gramann, III et al. |
| 2002/0010621 A1* | 1/2002 | Bell et al. ........................ 705/10 |
| 2002/0032589 A1 | 3/2002 | Shah |
| 2002/0099576 A1 | 7/2002 | MacDonald et al. |
| 2003/0023463 A1 | 1/2003 | Dombroski et al. |
| 2003/0105887 A1* | 6/2003 | Cox et al. ..................... 709/328 |
| 2003/0120526 A1 | 6/2003 | Altman et al. |
| 2003/0135507 A1 | 7/2003 | Hind et al. |
| 2004/0010451 A1 | 1/2004 | Romano et al. |
| 2004/0015380 A1 | 1/2004 | Timmins |
| 2004/0039626 A1 | 2/2004 | Voorhees |
| 2004/0139154 A1 | 7/2004 | Schwarze |
| 2004/0233236 A1* | 11/2004 | Yang ............................. 345/763 |
| 2005/0044003 A1 | 2/2005 | O'Keeffe et al. |
| 2005/0091111 A1 | 4/2005 | Green et al. |
| 2005/0097204 A1 | 5/2005 | Horowitz et al. |
| 2005/0149417 A1 | 7/2005 | Crescenzo et al. |
| 2005/0203844 A1* | 9/2005 | Ferguson et al. ............... 705/40 |
| 2005/0204367 A1 | 9/2005 | Minium et al. |
| 2005/0223392 A1 | 10/2005 | Cox et al. |
| 2006/0010452 A1* | 1/2006 | Sattler et al. ................. 719/313 |
| 2006/0020950 A1 | 1/2006 | Ladd et al. |
| 2006/0206363 A1 | 9/2006 | Gove |
| 2007/0033088 A1* | 2/2007 | Aigner et al. .................... 705/9 |
| 2007/0073596 A1* | 3/2007 | Alexander et al. ............. 705/26 |
| 2007/0198432 A1 | 8/2007 | Pitroda et al. |
| 2007/0233556 A1 | 10/2007 | Koningstein |
| 2007/0240029 A1 | 10/2007 | Kitada et al. |
| 2008/0168037 A1* | 7/2008 | Kapadia et al. .................. 707/3 |
| 2010/0017874 A1 | 1/2010 | Piccinini et al. |

OTHER PUBLICATIONS

Miller, Michael "The Complete Idiot's Guide to Online Auctions," (1999).

BuyTextiles.com (http://www.ecompartners.com/buytextiles/htm/listing_help.htm), 1-4 (1999).

David Koretz.com (http://dkoretz.typepad.com/rants/2006/06/featuretisement.html), 1-3 (2006).

International Search Report for International Patent Application No. PCT/US09/35127 Apr. 13, 2009).

Written Opinion of the International Searching Authority for International Patent Application No. PCT/US09/35127 (Apr. 3, 2009).

International Search Report for International Patent Application No. PCT/US07/71524, Jul. 15, 2008.

International Search Report for International Patent Application No. PCT/US07/71525, Aug. 27, 2008.

* cited by examiner

METHODS FOR INTEGRATING AND MANAGING ONE OR MORE FEATURES IN AN APPLICATION AND SYSTEMS THEREOF

FIELD OF THE INVENTION

This invention relates to methods for integrating and managing one or more features in a Web-based or client-server software application and systems thereof.

BACKGROUND

For the last forty years the software market has been built on a payment model involving large upfront fees for perpetual licenses and ongoing support fees. Companies had to purchase their own servers to run the client-server software and hire full-time staff to maintain the software. Consumer software had expensive licensing fees, and was infrequently updated. All of this put most software out of reach for the average small business and consumer. Today, client-server software still requires businesses to hire an internal IT person, or a value-added reseller. These costs still put most technology out of the reach of most small and mid-sized businesses. Today's desktop software is still expensive, and only periodically updated.

In the mid-1990s with the introduction of the World Wide Web, it was realized the World Wide Web could become an extremely cost effective and efficient delivery platform for software applications. Companies began developing applications that were built to be delivered over relatively slow Internet connections versus local area networks. These applications also were developed to support multi-tenancy, which meant thousands or millions of customers could share the same platform bringing tremendous efficiencies of scale. Further, these applications took advantage of the Web's inherent collaborative properties to let millions of people worldwide communicate as if they were on the same network. Applications, such as email and instant messaging, are great examples that leveraged this capability. Additionally, consumer applications, such as social networking services, were created to offer consumers new applications over the Web. This market is called Software as a Service (SaaS) and the applications are delivered for rent or free. Most of the applications are offered for free, and thus the challenge for developers of Web-based applications is how to generate revenue.

Consumers and small business customers largely have expected the Internet to be free and as a result have shown a huge resistance towards paying for content, with limited exceptions. Additionally, they have shown a resistance towards paying for Web-based applications, such as email and instant messaging. As a result, today thousands of Web-based applications offer primarily free services to consumers.

Instead, consumers and small businesses have been willing to accept viewing of advertising and sharing personal information with these free applications and content. Accordingly, in the SaaS market many companies have been trying to monetize their software applications with advertising revenue from third-party advertisers.

Currently, there are two primary methods for Internet advertising within an application that together represents more than eighty percent of online advertising: Cost Per Thousand Impressions (CPM) banner and display advertisements; and Cost Per Click (CPC) text and contextual ads. Both of these methods have significant limitations and downsides, including interfering with the user experience by taking up valuable screen real estate to place the advertising and invading the privacy of a user by scanning personal data as a means to understand relevance and then display ads. Additionally, neither of these methods works well in Web-based applications and they are viewed as detracting from the application by the user. Further, none of these prior methods alone maximize the potential for revenue generation.

Another emerging option is to integrate third-party partners into an application, sell consumers the premium product or service from the integrated third-party partner, and then generate revenue on a Cost Per Action (CPA) model. To achieve this, developers must manually and individually integrate each third party Web-based application, Web service, and online merchant into the application which is a difficult process. In particular, this integration process requires developing and integrating a reporting layer, a billing layer, a user interface framework, and other infrastructure necessary to support each third-party partner into the application. Most third party partners have limited or no Application Programming Interfaces ("APIs") making integration even more complicated.

It is equally difficult for application, Web service, and online merchant providers that wish to utilize third-party Web-based software applications as a distribution channel. They face significant challenges to achieve a wide syndication of their offerings. Typically, they have limited technological sophistication and lack the robust API's needed to simplify integration. Further, they are forced to individually integrate with each Web-based application, spending a large amount of technical and financial resources to achieve distribution.

Prior APIs have lacked the ability to easily and properly integrate a third-party Web-based feature into an application and have only been able to handle programmatic functions. Additionally, these prior APIs have been completely unaware of workflow which is critical to being able to integrate a feature into the right step(s) of a process of a user performing a given task in an application. Further, they have lacked any definition of the user interface. As a result, a provider of a feature has had little to no control over how a feature is integrated or how it looks to the user in an application.

This inability to easily and properly integrate a feature presents several major problems. For example, these integration difficulties often result in a poor workflow and a poor user interface which decreases usage and revenue generation with the feature. Additionally, these integration difficulties which cause the workflow and user interface issues often seriously damage the brand associated with the provided feature because of the poor resulting performance.

SUMMARY

A method for integrating and managing one or more features in an application in accordance with embodiments of the present invention includes obtaining data from at least one application provider system with at least one application and from one or more feature provider systems with one or more features. The obtained data is used to implement a programming interface between the syndication system and the application and the one or more features which can be integrated in the application. A selection of one or more of the features for integration in the application is received. The implementation of the programming interface between a syndication system and the application and the one or more selected features to be integrated in the application is generated. The generated implementation of the programming interface is provided to the application provider system with the application.

A computer readable medium in accordance with other embodiments of the present invention has stored thereon instructions for integrating and managing one or more features in an application comprising machine executable code which when executed by at least one processor, causes the processor to perform steps which includes obtaining data from at least one application provider system with at least one application and from one or more feature provider systems with one or more features. The obtained data is used to implement a programming interface between the syndication system and the application and the one or more features which can be integrated in the application. A selection of one or more of the features for integration in the application is received. The implementation of the programming interface between a syndication system and the application and the one or more selected features to be integrated in the application is generated. The generated implementation of the programming interface is provided to the application provider system with the application.

A system for integrating and managing one or more features in an application in accordance with other embodiments of the present invention includes a syndication system with a registration system and an integration system. The registration system obtains data from at least one application provider system with at least one application and from one or more feature provider systems with one or more features. The obtained data is used to implement a programming interface between the syndication system and the application and the one or more features which can be integrated in the application. The registration system receives a selection of one or more of the features for integration in the application. The integration system generates the implementation of the programming interface between the syndication system and the application and the one or more selected features to be integrated in the application. The integration system provides the generated implementation of the programming interface to the application provider system with the application.

The present invention provides a number of advantages including providing an effective and automated method for integrating and managing one or more features in a Web-based or desktop software application. The present invention dramatically reduces the amount of time required to integrate these features into an application. Additionally, the present invention uses a single reporting layer so all features can easily be presented in a single reporting interface. Further, the present invention utilizes a single billing layer so that all features can easily be billed to the user in a consistent fashion and integrated into any third-party billing system. Even further, the present invention utilizes a consistent user interface to provide the user with the highest quality experience.

The present invention also provides systems and methods that combine the programmatic elements of an API with a workflow designer system and a user interface designer system into a single solution. This present invention enables providers of Web-based features to offer their services to any application developer while controlling the quality of the integration and maximizing revenue.

DETAILED DESCRIPTION

Figure 1A:
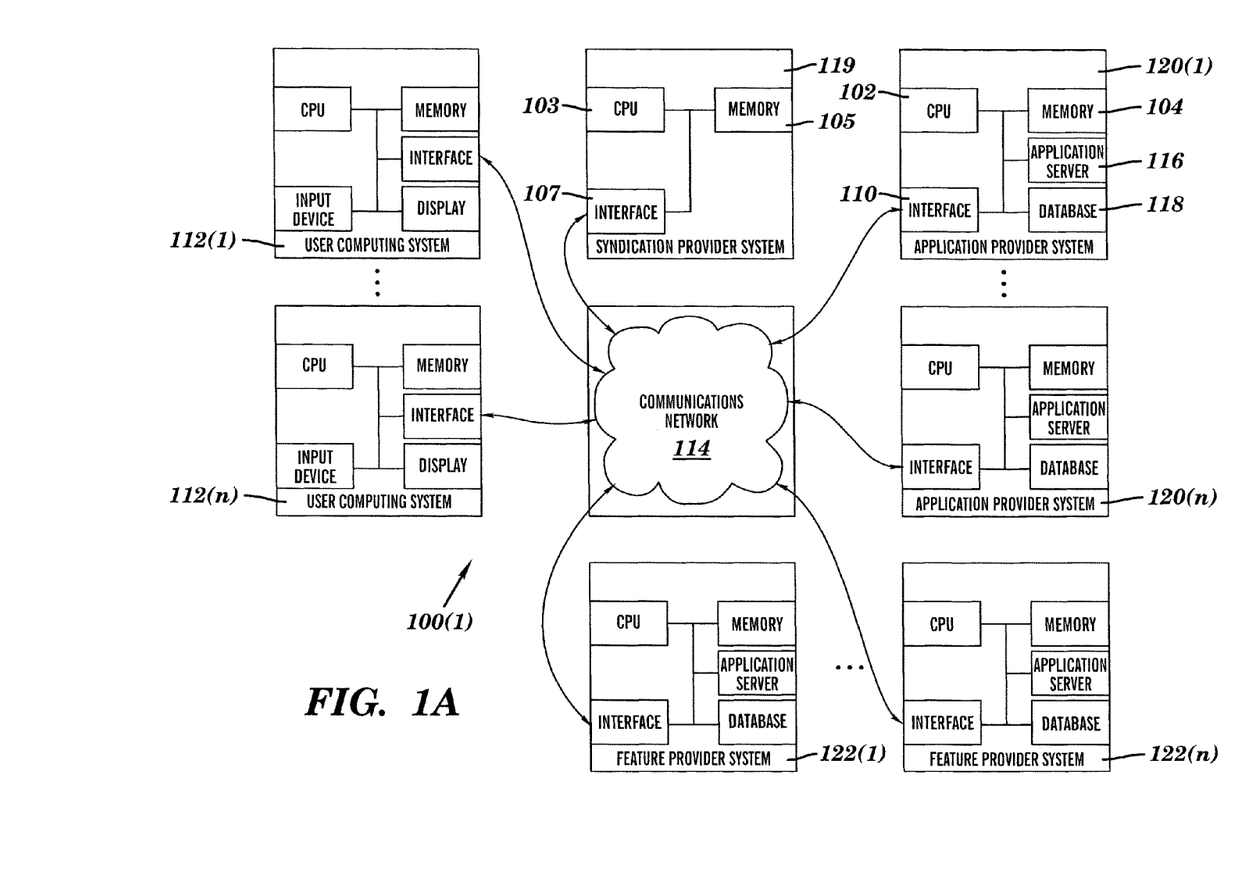
FIG. 1A is a block diagram of a system that integrates and manages one or more features in a Web-based or client-server software application in accordance with embodiments of the present invention.

A system 100(1) that integrates and manages one or more features in a Web-based or client-server software application in accordance with embodiments of the present invention is illustrated in FIG. 1A. The system 100(1) includes user computing systems 112(1)-112(n), a syndication provider system 119, application provider systems 120(1)-120(n), feature provider systems 122(1)-122(n), and a communications network 114, although the system 100(1) can include other numbers and types of systems, devices, equipment, parts, components, and/or elements in other configurations. The present invention provides a number of advantages including providing an effective and automated method and system for integrating and managing one or more features in a Web-based or client-server software application.

Referring more specifically to FIG. 1A, each of the user computing systems 112(1)-112(n) enables a user to access content and/or utilize one or more applications from one or more of the application provider systems 120(1)-120(n), although one or more of the user computing systems 112(1)-112(n) could access content and/or utilize other types and numbers of applications from other sources and could provide a wide variety of other functions for the user. Additionally, each of the user computing systems 112(1)-112(n) enables a user to access one or more features from one or more of the feature provider systems 122(1)-122 (n) which are activated the application in response to one or more actions, although one or more of the user computing systems 112(1)112(n) could access other types and numbers of features. Although multiple user computing systems are shown, the system 100(1) can have other numbers and types of user computing systems.

Each of the user computing systems 112(1)-112(n) includes a central processing unit (CPU) or processor, a memory, user input device, a display, and an interface system, and which are coupled together by a bus or other link, although one or more of the user computing systems 112(1)-112(n) can include other numbers and types of components, parts, devices, systems, and elements in other configurations. The processor in each of the user computing systems 112(1)-112(n) executes a program of stored instructions for one or more aspects of the present invention as described and illustrated herein, although the processor could execute other numbers and types of programmed instructions.

The memory in each of the user computing systems 112(1)-112(n) stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to one or more processors, can be used for the memory in each of the user computing systems 112(1)-112(n).

The user input device in each of the user computing systems 112(1)-112(n) is used to input selections, such as requests for an application or requests for content or services through transactions with one or more features which are integrated into the application, although the user input device could be used to input other types of data and interact with other elements. The user input device can include a computer keyboard and a computer mouse, although other types and numbers of user input devices can be used. The display in each of the user computing systems 112(1)-112(n) is used to show data and information to the user, such as travel bookings, advertisements, news articles by way of example only. The display can include a computer display screen, such as a CRT or LCD screen, although other types and numbers of displays could be used.

The interface system in each of the user computing systems 112(1)-112(n) is used to operatively couple and communicate between the user computing systems 112(1)-112(n) and the syndication provider system 119, the application provider systems 120(1)-120(n) and the feature provider systems 122(1)-122(n) via the communications network 114, although other types and numbers of communication networks or systems with other types and numbers of connections and configurations can be used. By way of example only, the communication network 114 can use TCP/IP over Ethernet and industry-standard protocols, including SOAP, XML, LDAP, and SNMP, although other types and numbers of communication networks, such as a direct connection, a local area network, a wide area network, modems and phone lines, e-mail, and wireless communication technology, each having their own communications protocols, can be used.

The syndication provider system 119 provides a user interface framework which allows it to manage interactions between one or more of the user computing systems 112(1)-112(n) and one or more features provided by feature providers systems 122(1)-122(n) integrated into one or more applications provided by the application provider systems 120(1)-120(n). The syndication provider system 119 also provides administration tools to track and manage reporting and revenue generation based on those interactions, although the syndication provider system 119 can provide other numbers and types of functions. Although one syndication provider system 119 is shown, the system 100(1) can have other numbers and types of syndication provider systems.

The syndication provider system 119 includes a central processing unit (CPU) or processor 103, a memory 105, and an interface system 107 which are coupled together by a bus or other link, although other numbers and types of components, parts, devices, systems, and elements in other configurations and locations can be used. The processor in the syndication provider system 119 executes a program of stored instructions one or more aspects of the present invention as described and illustrated by way of the embodiments herein, although the processor could execute other numbers and types of programmed instructions.

The memory 105 in the syndication provider system 119 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 103, can be used for the memory 105 in the syndication provider system 119.

The interface system 107 in the syndication provider system 119 is used to operatively couple and communicate between the syndication provider system 119 and the user computing systems 112(1)-112(n), the application provider systems 120(1)-120(n) and the feature provider systems 122(1)-122(n) via the communications network 114, although other types and numbers of communication networks or systems with other types and numbers of connections and configurations can be used.

Each of the application provider systems 120(1)-120(n) provides one or more software applications for use by one or more of the user computing systems 112(1)-112(n), although one or more of the application provider systems 120(1)-120(n) can provide other numbers and types of applications and/or content and can have provide other numbers and types of functions. Although multiple application provider systems are shown, the system 100(1) can have other numbers and types of application provider systems.

Each of the application provider systems 120(1)-120(n) includes a central processing unit (CPU) or processor 102, a memory 104, interface system 110, application server 116, and database 118 which are coupled together by a bus or other link, although each of the application provider systems 120(1)-120(n) could have other numbers and types of components, parts, devices, systems, and elements in other configurations and locations can be used. The processor 102 in each of the application provider systems 120(1)-120(n) executes a program of stored instructions one or more aspects of the present invention as described and illustrated by way of the embodiments herein, including managing application functionality, although the processor could execute other numbers and types of programmed instructions.

The memory 104 in each of the application provider systems 120(1)-120(n) stores these programmed instructions for one or more aspects of the present invention as described and illustrated by way of the embodiments herein including managing application functionality, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 102, can be used for the memory 104 in each of the application provider systems 120(1)-120(n).

The interface system 110 in each of the application provider systems 120(1)-120(n) is used to operatively couple and communicate between the application provider systems 120(1)-120(n) and the user computing systems 112(1)-112(n), the syndication provider system 119, and the feature provider systems 122(1)-122(n) via communications network 114, although other types and numbers of communication networks or systems with other types and numbers of connections and configurations can be used.

The application server in each of the application provider systems 120(1)-120(n) runs one or more software applications that can be shared by one or more of the user computing systems 112(1)-112(n) and also shares the data processing burden with one or more of the user computing systems 112(1)-112(n), although other numbers and types of servers can be used and other functionality can be carried out. The database in each of the application provider systems 120(1)-120(n) stores content, user settings, and one or more applications, although other types and numbers of data storage devices can be used and other types and amounts of information can be stored on the database.

The feature provider systems 122(1)-122(n) provide one or more features, such as flower ordering, gift ordering, mapping and driving directions, yellow pages, travel ordering, event ticket ordering, weather information, faxing, email marketing, web conferencing, and package delivery by way of example only, for integration into one or more applications provided by the application provider systems 120(1)-120(n), although each of the feature provider systems 122(1)-122(n) could provide other numbers and types of features and functions for integration. Although multiple feature provider systems are shown, the system 100(1) can have other numbers and types of feature provider systems Each of the feature provider systems 122(1)-122(n) includes a central processing unit (CPU) or processor, a memory, an interface system, an application server, and a database which are coupled together by a bus or other link, although other numbers and types of components, parts, devices, systems, and elements in other configurations and locations could be used. The processor in each of the feature provider systems 122(1)-122(n) executes a program of stored instructions for one or more aspects of the present invention as described and illustrated by way of the embodiments herein including managing feature functionality, although the processor could execute other numbers and types of programmed instructions. The memory in each of the feature provider systems 122(1)-122(n) stores these programmed instructions for one or more aspects of the present invention as described and illustrated by way of the embodiments herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in each of the feature provider systems 122(1)-122(n).

The interface system in each of the feature provider systems 122(1)-122(n) is used to operatively couple and communicate between the feature provider systems 122(1)-122(n) and the syndication provider system 119, the application provider systems 120(1)-120(n) and the user computing systems 112(1)-112(n) via communications network 114, although other types and numbers of communication networks or systems with other types and numbers of connections and configurations can be used.

The application server in each of the feature provider systems 122(1)-122(n) runs one or more applications related to the one or more features which are integrated into the application, although other numbers and types of servers can be used and other numbers and types of functions can be provided. The database in each of the feature provider systems 122(1)-122(n) stores data related to the one or more features, although other types and numbers of data storage devices can be used and other types and amounts of information can be stored on the database server.

Although embodiments of the user computing systems 112(1)-112(n), the syndication provider system 119, the application provider systems 120(1)-120(n), and the feature provider systems 122(1)-122(n) are described and illustrated herein, each of the user computing systems 112(1)-112(n), the syndication provider system 119, application provider systems 120(1)-120(n), and the feature provider systems 122(1)-122(n) can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, digital signal processors, and micro-controllers, programmed according to the teachings of the embodiments, as described and illustrated herein, and as will be appreciated by those of ordinary skill in the art.

In addition, two or more computing systems or devices can be substituted for any one of the systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

Figure 1B:
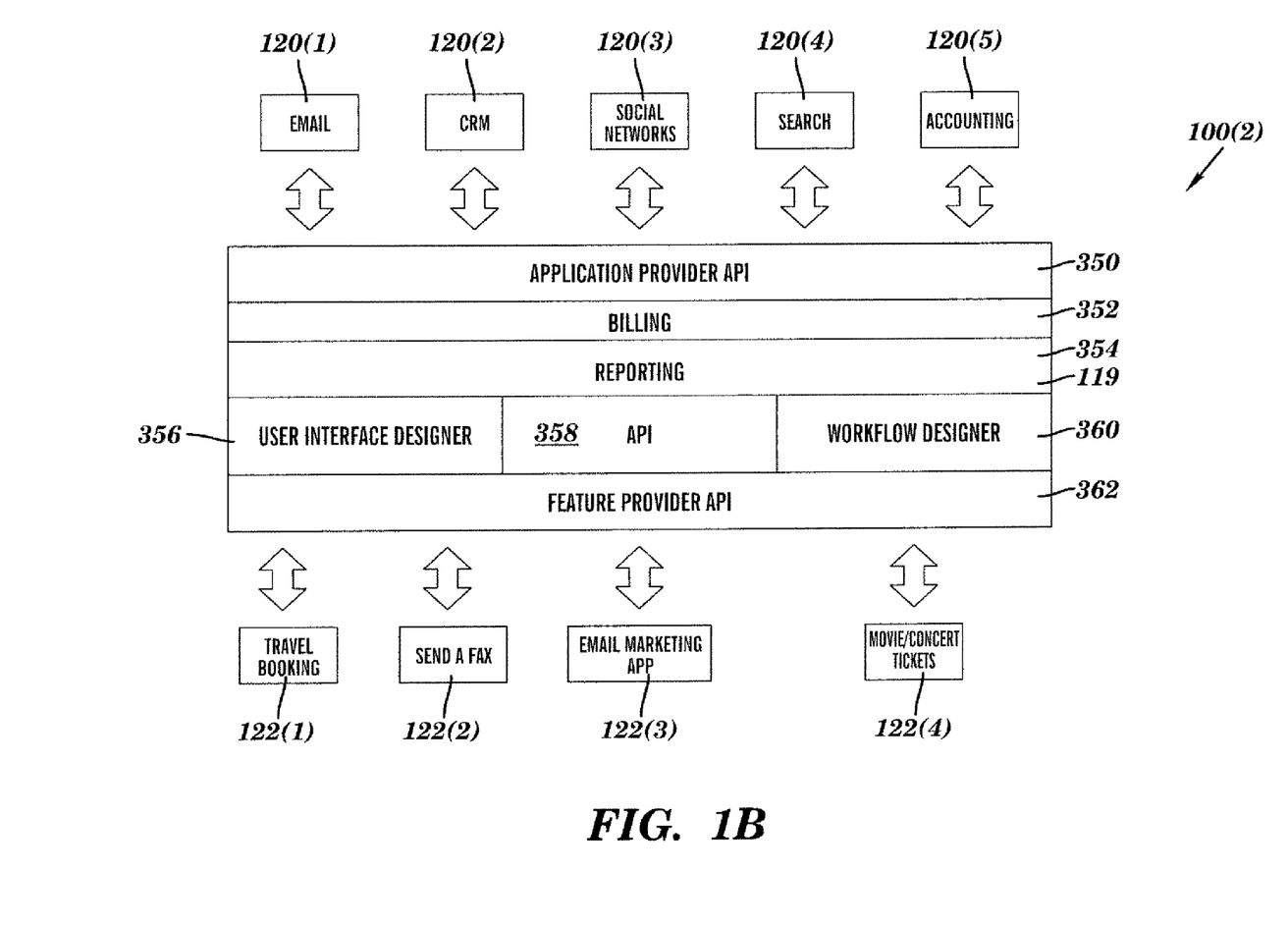
FIG. 1B is a functional block diagram of one example of the system illustrated in FIG. 1A.

By way of example only, a functional block diagram of a system 100(2) is illustrated in FIG. 1B. The system 100(2) is the same as the system 100(1) as described and illustrated herein and is included for exemplary purposes only. For ease of illustration, the user computing systems are not shown in this functional diagram.

The system 100(2) includes the syndication provider system 119, the application provider systems 120(1)-120(5) and feature provider systems 122(1)-122(4), although other numbers and types of applications and features could be listed. In this example, the application provider systems 120(1)-120(5) provide applications for: Email; Customer Relationship Management (CRM); Social Networks; Search; and Accounting, respectively, and the feature provider systems 122(1)-122(4) provide features for the following services: Travel Booking; Send a Fax; Email Marketing; and Movie Concert Tickets, respectively, although other numbers and types of applications and features could be listed.

The syndication provider system 119 includes an application provider API 350, a billing system 352, a reporting system 354, a user interface design system 356, an application programming interface system 358, a workflow design system 360, and a feature provider API 362. The application provider API 350 provides the application interfaces between the syndication provider system 119 and the application provider system 120(1)-120(5), although other numbers and types of interfaces can be provided. The feature provider API 362 provides the application interfaces between the syndication provider system 119 and the feature provider systems 122(1)-122(4), although other numbers and types of interface can be provided.

The billing system 352 enables the syndication provider system 119 to monitor and manage the billing and any associated collections for transactions involving any of the feature provider systems 122(1)-122(4), although other numbers and types of billing and monetization functions can be carried out. The reporting system 354 enables the syndication provider system 119 to monitor and manage all of the transactions with the features provided by the feature provider systems 122(1)-122(5) which are utilized in the applications provided by the application provider systems 120(1)-120(5), although other numbers and types of reporting and monitoring functions can be carried out.

The user interface design system 356, the application programming interface system 358, and the workflow design system 360 in the syndication provider system each assist with the proper integration of any of the features from the feature provider systems 122(1)- 122(4) into any of the applications from the application provider system 120(1)-120(5), although other types and numbers of systems to assist with integration may be used. In particular, the user interface design system 356 assists during the integration of a feature provided by one of the feature provider systems 122(1)-122(4) by providing a definition of the user interface and providing control over how a feature is integrated and looks to the user in an application provided by one of the application provider systems 120(1)-120(5), although other numbers and types of functions could be provided.

The user interface design system 356 lets each of the feature provider systems 122(1)-122(4) which are being integrated into the application create and define each screen of the user interface. The feature provider systems 122(1)-122(4) uses an XML template that defines each image to be included on an interface screen, the size of each image, and the location of each image, although other types of technologies could be used and other relevant attributes of the images could be used. Additionally, the XML template defines the Cascading Style Sheets (CSS) or other similar layout technologies. Further, the XML template defines all of the buttons, tabs, check boxes, list boxes, and other interface elements and the location of each interface element. The XML template also defines the list of functions that can be used for a given screen. The XML template may also include other interface-related features. The user interface design system 356 also includes a master list of all user interface screens for a given feature.

The application programming interface system 358 assists with the connection of the application programming interfaces between the syndication provider system 119 and the feature provider systems 122(1)-122(4), although other numbers and types of functions could be provided. The application programming interface system 358 defines all of the programmatic functions available in the given feature. In this example, the implementation is an XML-based API, although other types of API's may be used. An XML template list all available functions for a given feature, an explanation of what each function does, the format needed for the communication, and the expected response. Functions in the XML template may be required, optional, or not available for a given user interface screen.

The workflow design system 360 assists during the integration of a feature provided by one of the feature provider systems 122(1)-122(4) by providing information on workflow so the feature can be integrated into the right step of a process of a user performing a given task in an application provided by one of the application provider systems 120(1)-120(5). The workflow design system 360 lets each of the feature provider systems 122(1)-122(4) which are being integrated into the application define a list of all the different workflow scenarios available for a given feature. Each feature may have one or more workflow scenarios, so that it can fit in several different places within a given application and can fit in multiple applications. For each workflow, an XML template is defined, although other technologies could be used, that defines the order of one or more screens developed in the interface designer for the given workflow.

Figure 2:
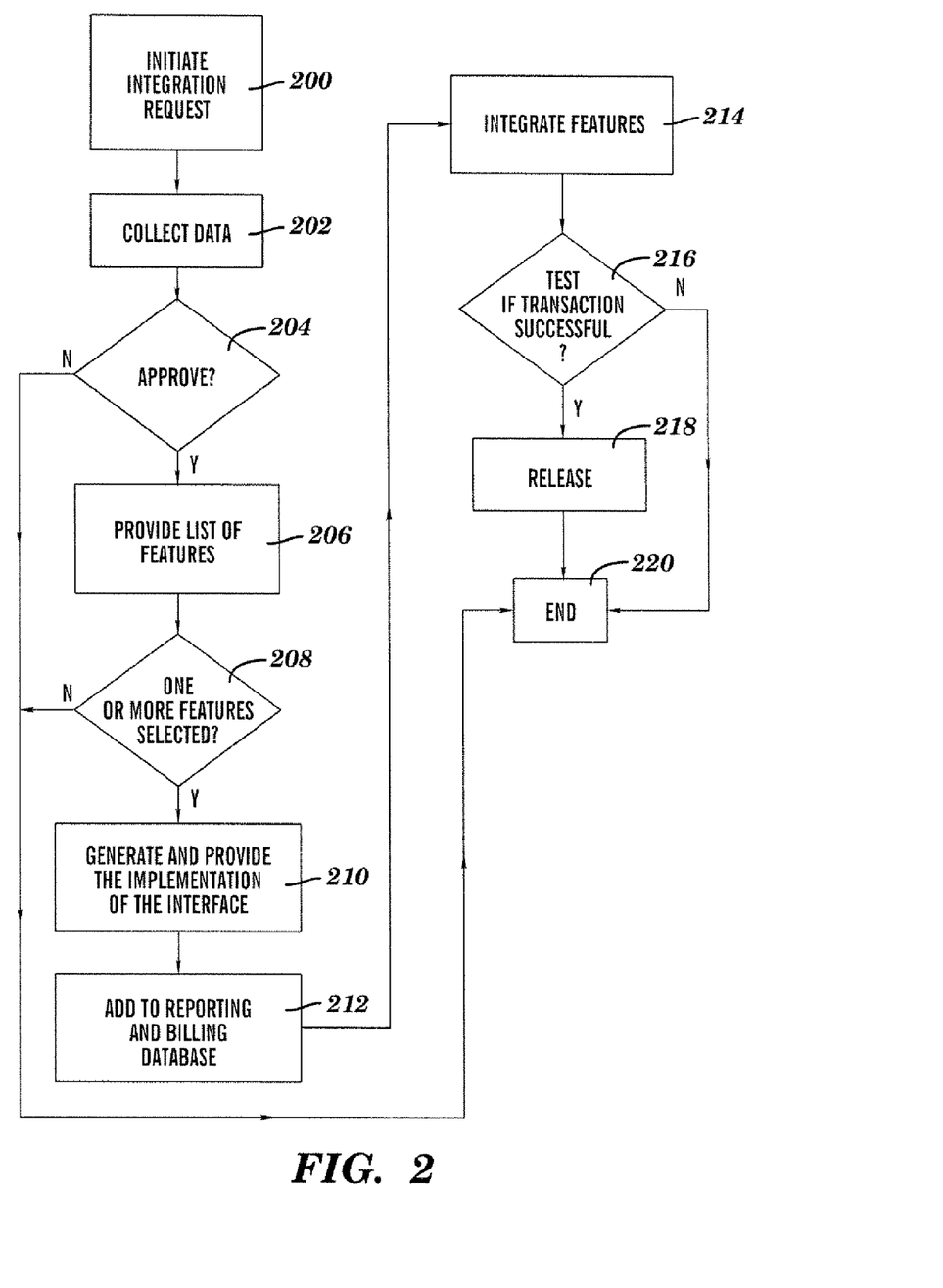
FIG. 2 is a flow chart of a method for initially integrating one or more features in a Web-based or client-server software application in accordance with other embodiments of the present invention.

The operation of the system 100(1) to initially integrate and manage one or more features in a Web-based or client-server software application in accordance with embodiments of the present invention will now be described with reference to FIGS. 1-2. In step 200, one of the application provider systems 120(1)-120(n) submits a request to the syndication provider system 119 to integrate one or more features from one or more of the feature provider systems 122(1)-122(n) into one or more applications run on the requesting one of the application provider systems 120(1)-120(n), although other numbers of requests and other manners for integrating the one or more features into one or more applications can be used.

In step 202, the syndication provider system 119 requests and collects data from the requesting one of the application provider systems 120(1)-120(n) and the one or more of the feature provider systems 122(1)-122(n) which provided the one or more features. The collected data relates to the type of application and one or more features along with connectivity information to the application and one or more features and other background information on the requesting one of the application provider systems 120(1)-120(n) and the one or more of the feature provider systems 122(1)-122(n), although other types and amounts of data could be collected or obtained in other manners. By way of example only, the data collected here is information on the type of application the application provider system is (e.g., an email application, a CRM application, a social network application, a search application, or an accounting application), financial details, information about the number of users, and the branding of the application, although other types and amounts of data can be collected. With this data, the feature provider systems 122(1)-122(n) will each only want their feature integrated into applications provided by the application provider systems 120(1)-120(n) that match their user profile and brand profile. For example, a credit card feature provider may not want to be integrated into a gambling application. This data gives the one of the feature provider systems 122(1)-122(n) the ability to control who uses their feature In step 204, the syndication provider system 119 determines whether to approve the requesting one of the application provider systems 120(1)-120(n) and each of the one or more of the feature provider systems 122(1)-122(n) providing the one or more features based on the collected data and one or more stored criteria, although other manners for determining which application provider systems 120(1)-120(n) and feature provider systems 122(1)-122(n) can be used. A variety of different criteria can be used for the determination, such as stored data on which application provider systems 120(1)-120(n) and the feature provider systems 122(1)-122(n) are acceptable. If the requesting one of the application provider systems 120(1)-120(n) and each of the one or more of the feature provider systems 122(1)-122(n) are not approved, then the No branch is taken to step 220 where this process ends. If the requesting one of the application provider systems 120(1)-120(n) and each of the one or more of the feature provider systems 122(1)-122(n) are approved, then the Yes branch is taken to step 206.

In step 206, the syndication provider system 119 provides the requesting one of the application provider systems 120(1)-120(n) an initial list of one or more features from one or more of the feature provider systems 122(1)-122(n) which can be integrated, although other manners for obtaining a selection of features can be used. The particular number and type of features provided in each list to one or more of the application provider systems 120(1)- 120(n) can vary. By way of example only, stored tables can be used to determine which one or more features to offer to each of the application provider systems 120(1)-120(n) based on one or more factors, such as the particular type of application and users of each application.

In step 208, the requesting one of the application provider systems 120(1)-120(n) can select from the list one or more of the features from one or more of the feature provider systems 122(1)-122(n). If none of the features are selected by the requesting one of the application provider systems 120(1)-120(n), then the No branch is taken to step 220 where this process ends. If one or more of the features are selected, then the requesting one of the application provider systems 120(1)-120(n) transmits the selection of the one or more features to the syndication provider system 119 and the Yes branch is taken to step 210.

In step 210 the syndication provider system 119 generates an implementation of an interface for the application in the requesting one of the application provider systems 120(1)-120(n) based on the collected data for the requesting one of the application provider systems 120(1)-120(n) and the one or more feature provider systems 122(1)-122(n) with the selected features, although other manners for generating the interface can be used. The implementation of the interface is an API or SDK which includes code, images, work flow, and a unique identifier that identifies the requesting one of the application provider systems 120(1)-120(n) so the syndication provider system 119 can track transactions for reporting and billing purposes, although other types and numbers of implementations can be generated. The syndication provider system 119 provides the generated implementation to the requesting one of the application provider systems 120(1)-120(n).

In step 212 the syndication provider system 119 registers the unique identifier associated with the application in the requesting one of the application provider systems 120(1)-120(n) and the selected one or more features from one or more feature provider systems 122(1)-122(n) in the reporting database and monetization database to track transactions and determine revenue sharing based on each transaction. The syndication provider system 119 may also store other data, such as user credit card data and other billing and accounting information in a user database.

In step 214, the requesting one of the application provider systems 120(1)-120(n) performs the integration of the interface between the syndication provider system 119 and the requesting one of the application provider systems 120(1)-120(n) along with the one or more feature provider systems 122(1)-122(n) with the one or more selected features.

In step 216, a test transaction of the interface is conducted by the syndication provider system 119 and the requesting one of the application provider systems 120(1)-120(n) along with the one or more feature provider systems 122(1)-122(n) with the one or more selected features, although other numbers and types of manners for testing the integrated interface can be used. If the test transaction is not successful, then the No branch is taken to step 220 where this process ends. If the test transaction is successful, then the Yes branch is taken to step 218.

In step 218, the syndication provider system releases the interface at the requesting one of the application provider systems 120(1)-120(n) for actual transactions. In step 220, this process ends and the application with the one or more features is ready for use.

Figure 3:
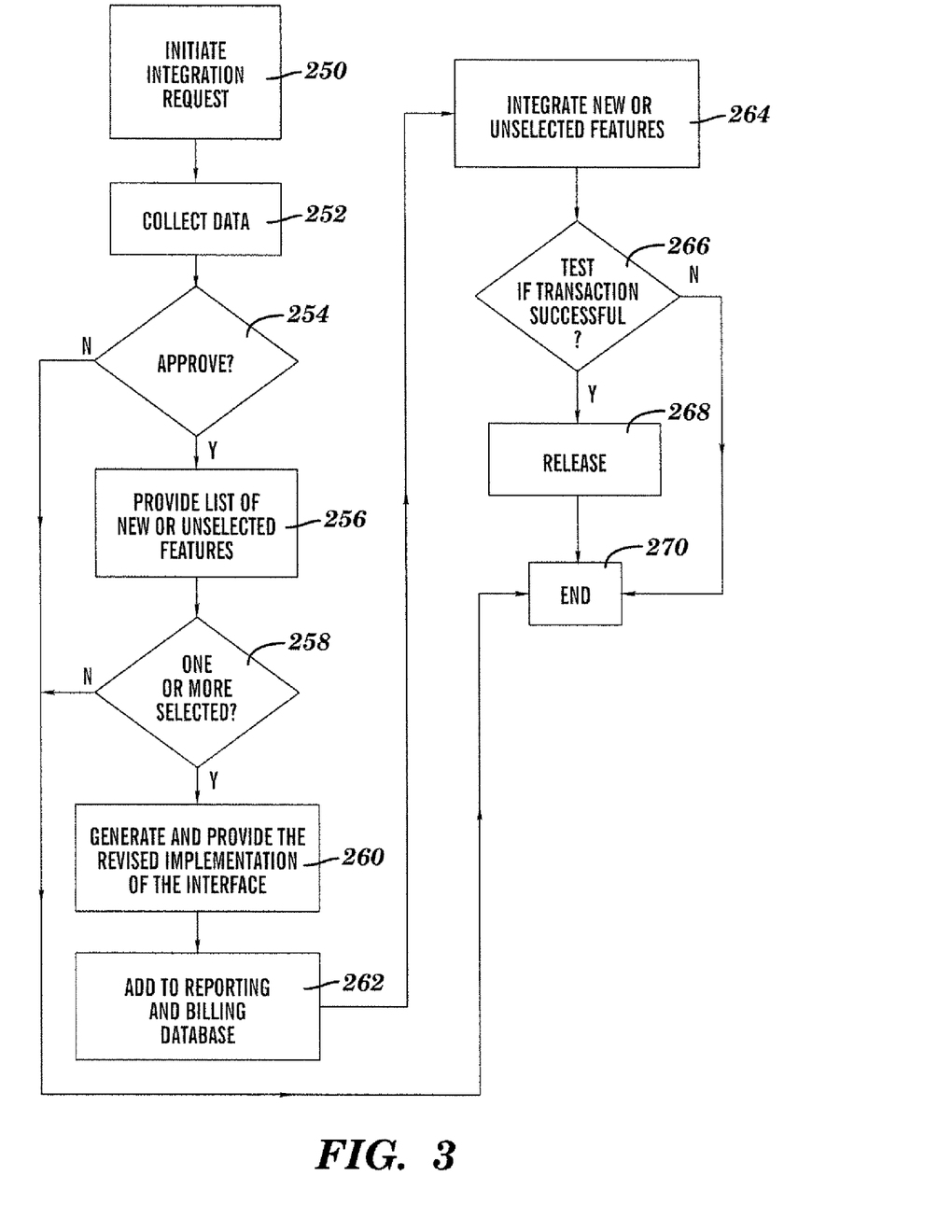
FIG. 3 is a flow chart of a method for subsequently integrating one or more additional features and unselected features in a Web-based or client-server software application in accordance with other embodiments of the present invention.

The operation of the system 100(1) to subsequently integrate one or more additional and/or previously unselected features in a Web-based or client-server software application in accordance with embodiments of the present invention will now be described with reference to FIGS. 1 and 3. In step 250, one or more of the feature provider systems 122(1)-122(n) submits a request to the syndication provider system 119 to offer one or more additional features for integration into one or more applications run on the requesting one of the application provider systems 120(1)-120(n), although other numbers and manners of requests can be used.

In step 252, the syndication provider system 119 requests and collects data from the requesting one or more of the feature provider systems 122(1)-122(n) which provided the one or more additional features. The collected data relates to the type of one or more additional features along with connectivity information to the one or more features and other background information on the one or more of the feature provider systems 122(1)-122(n), although other types and amounts of data could be collected or obtained in other manners.

In step 254, the syndication provider system 119 determines whether to approve each of the one or more of the feature provider systems 122(1)-122(n) providing the one or more additional features based on the collected data and one or more stored criteria, although other manners for determining which application provider systems 120(1)-120(n) and feature provider systems 122(1)-122(n) can be used. A variety of different criteria can be used for the determination, such as stored data on which of the feature provider systems 122(1)-122(n) are acceptable. If the requesting one or more of the feature provider systems 122(1)-122(n) are not approved, then the No branch is taken to step 270 where this process ends. If the requesting one or more of the feature provider systems 122(1)-122(n) are approved, then the Yes branch is taken to step 256.

In step 256, the syndication provider system 119 provides the requesting one of the feature provider systems 122(1)-122(n) a list of one or more additional and/or previously unselected features from one or more of the feature provider systems 122(1)-122(n) which can be integrated, although other manners for obtaining a selection of additional and/or previously unselected features can be used. The particular number and type of additional and/or previously unselected features provided to one or more of the application provider systems 120(1)-120(*n*) can vary. By way of example only, stored tables can be used to determine which one or more additional and/or previously unselected features to offer to each of the application provider systems 120(1)-120(*n*) based on one or more factors, such as the particular type of application and users of each application.

In step 258, the requesting one of the application provider systems 120(1)-120 (*n*) can select from the list one or more of the additional and/or previously unselected features from one or more of the feature provider systems 122(1)-122(*n*). If none of the additional and/or previously unselected features are selected by the requesting one of the application provider systems 120(1)-120(*n*), then the No branch is taken to step 270 where this process ends. If one or more of the additional and/or previously unselected features are selected, then the requesting one of the application provider systems 120(1)-120(*n*) transmits the selection of the one or more additional and/or previously unselected features to the syndication provider system 119 and the Yes branch is taken to step 260.

In step 260 the syndication provider system 119 generates a revised implementation of the interface for the application in the requesting one of the application provider systems 120(1)-120(*n*) based on the collected data for the one or more feature provider systems 122(1)-122(*n*) with the selected additional and/or previously unselected features, although other manners for generating the revised interface can be used. The revised implementation of the interface is a revised API or SDK which includes code, images, work flow, and a unique identifier that identifies the requesting one of the application provider systems 120(1)-120(*n*) so the syndication provider system 119 can track transactions for reporting and billing purposes, although other types and numbers of implementations can be generated. The syndication provider system 119 provides the revised implementation to the requesting one of the application provider systems 120(1)-120(*n*).

In step 262 the syndication provider system 119 registers the unique identifier associated with the requesting one of the application-provider systems 120(1)-120(*n*) with the selected one or more additional and/or previously unselected features from one or more feature provider systems 122(1)-122(*n*) in the reporting database and monetization database to track transactions and determine revenue sharing based on each transaction.

In step 264, the requesting one of the application provider systems 120(1)-120(*n*) performs the integration of the revised interface between the syndication provider system 119 and the one or more feature provider systems 122(1)-122(*n*) with the one or more selected additional and/or previously unselected features.

In step 266, a test transaction of the interface is conducted by the syndication provider system 119 and the requesting one of the application provider systems 120(1)-120(*n*) along with the one or more feature provider systems 122(1)-122(*n*) with the one or more selected additional and/or previously unselected features, although other numbers and types of manners for testing the integrated interface can be used. If the test transaction is not successful, then the No branch is taken to step 270 where this process ends. If the test transaction is successful, then the Yes branch is taken to step 268.

In step 268, the syndication provider system releases the revised interface at the requesting one of the application provider systems 120(1)-120(*n*) for actual transactions. In step 270, this process ends and the application with the one or more features is ready for use.

Figure 4:
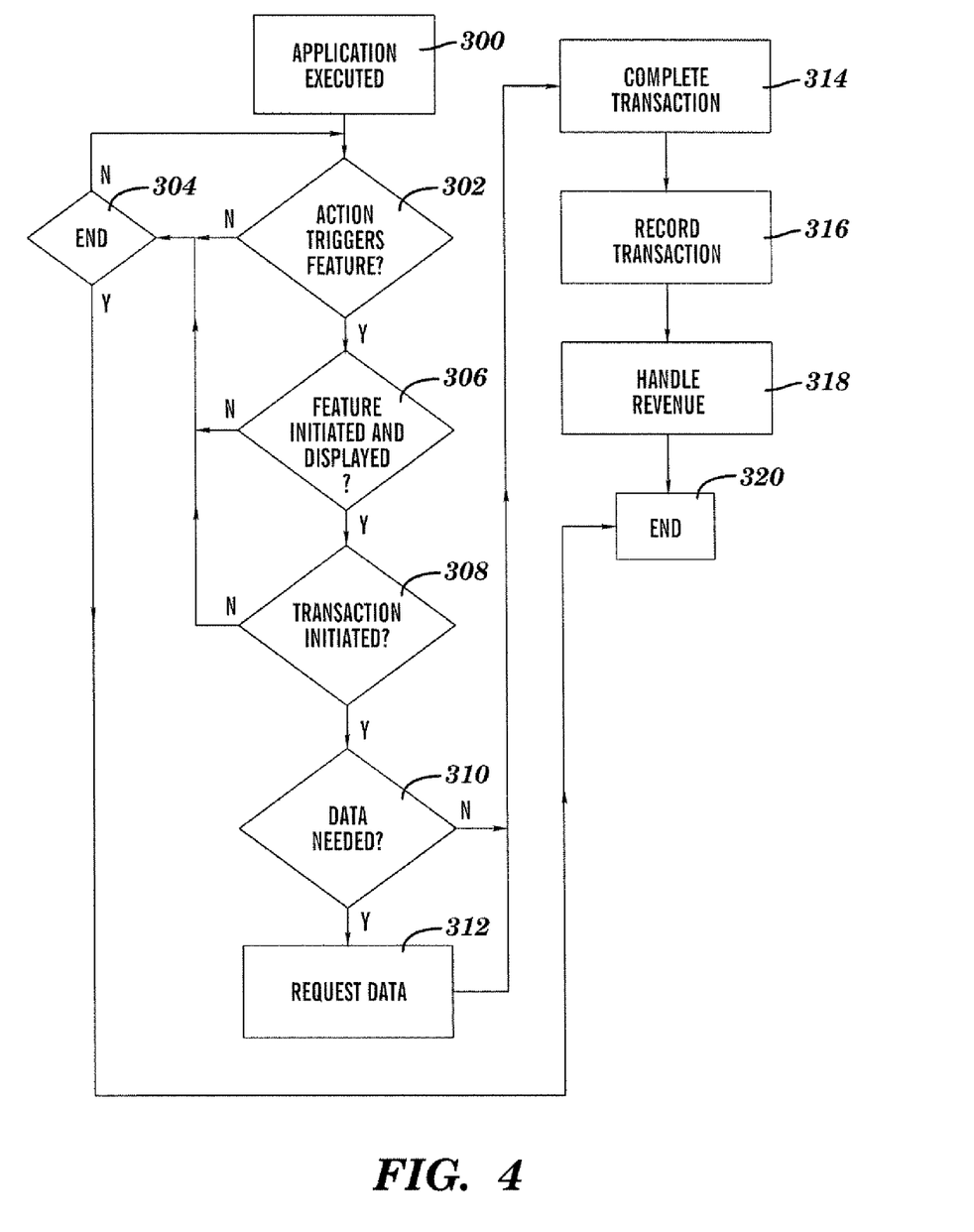
FIG. 4 is a flow chart of a method for managing the use of one or more features in a Web-based or client-server software application in accordance with other embodiments of the present invention.

The operation of the system 100(1) to manage the use of one or more features in a Web-based or client-server software application in accordance with other embodiments of the present invention will now be described with reference to FIGS. 1 and 4. In step 300, a user at one of the user computing systems 112(1)-112(*n*) initiates a request for an application from one of the application provider systems 122(1)-122(*n*). In response to the request, the requested application is executed and displayed at the one of the user computing systems 112(1)-112(*n*) with the user.

In step 302, the one of the application provider systems 120(1)-120(*n*) with the application that is being executed monitors for one or more actions, such as scheduling an appointment that contains the word "hotel" or "flight" or receiving a request to fax or print and overnight ship an item by way of example only. If one or more of the actions being monitored is not detected, then the No branch is taken to Step 304. In step 304, the one of the application provider systems 120(1)-120(*n*) with the application that is being executed determines if the application being executed has ended. If the application has not ended, then the No branch is taken back to step 302. If the application has ended in step 304, then the Yes branch is taken to step 320 where this process ends. If one or more of the actions being monitored is detected, then the one or more features associated with those one or more detected actions are activated and displayed in the application on the one of the user computing systems 112(1)-112(*n*) with the application executing and the Yes branch is taken to Step 306.

In step 306, the user at the one of the user computing systems 112(1)- 112(*n*) can initiate and have displayed any feature in the application. If the one of the application provider systems 120(1)-120(*n*) with the application that is being executed does not have a feature that has been initiated and displayed, then the No branch is taken to step 304 as described earlier. If the one of the application provider systems 120(1)-120(*n*) with the application that is being executed does have a feature that has been initiated and displayed, then the Yes branch is taken to step 308.

In step 308, the user at the one of the user computing systems 112(1)-112(*n*) can initiate a transaction with the initiated and displayed feature. If a transaction is not initiated, then the No branch is taken to step 304 as described earlier. If a transaction is initiated, then the Yes branch is taken to step 310.

In step 310, the syndication provider system 119 checks the user database for stored information on the user at the one of the user computing systems 112(1)-112(*n*) that initiated the transaction to determine if additional data is needed. If data is not needed, then the No branch is taken to step 314. If data is needed, then the Yes branch is taken to step 312. In step 312 the syndication provider system 119 requests the needed data from the user at the one of the user computing systems 112(1)- 112(*n*) that initiated the transaction. In steps 314 and 316, the syndication provider system 119 completes and records the transaction in the reporting database and then stores any newly acquired data in the user database.

In step 318, the syndication provider system 119 determines how to share any revenue resulting from the completion of the transaction with the one of the feature provider systems 122(1)-122(*n*) that provided the feature and with the one of the application provider systems 120(1)-120(*n*) that provided the application with the integrated feature. By way of example only, the revenue could be from the completed transaction or could be a payment from a feature provider resulting from directing traffic to and use of a non-monetary feature. A variety of criteria can be established for determining how to divide the revenue from the transaction, such as fixed percentages to each involved entity. In step 320, this process ends.

Accordingly, the present invention provides an effective and automated method and system for integrating one or more features into a Web-based or client-server software application. With the present invention, a variety of features, including by way of example only flower ordering, gift ordering, mapping and driving directions, yellow pages, travel ordering, event ticket ordering, weather information, faxing, email marketing, web conferencing, and package delivery, can be seamlessly integrated into an application. The present invention is versatile and enables features to be integrated into a wide range of applications, including, but not limited to calendars, contacts, task management, instant messaging, Voice over Internet Protocol (VoIP), file storage, file sharing, email, web conferencing, sales force automation, and CRM.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for integrating and managing features in an application, the method comprising:
    obtaining by a syndication provider apparatus application data from at least one application provider system with at least one application and feature data from at least one feature provider system with a plurality of features, the application data comprising a type of service provided to a user of the application, a number of users of the application, or a branding of the application, and the feature data comprising at least integration preference data;
    determining by the syndication provider apparatus when to approve an integration request received from the application provider system based on the obtained application data and integration preference data;
    providing by the syndication provider apparatus to the application provider system a list of one or more of the features and receiving a selection of one of the features for integration with the application when the integration request is determined to be approved;
    generating by the syndication provider apparatus an implementation of a programming interface between the application and the one feature to be integrated in the application, wherein the implementation comprises content that can be integrated in and displayed by the application and the content facilitates a transaction and comprises one or more user interface-related features defined by an eXtensible Markup Language (XML) template; and
    providing by the syndication provider apparatus the generated implementation of the programming interface to the application provider system.

2. The method as set forth in claim 1 further comprising:
    performing by the syndication provider apparatus one or more test transactions to determine when the programming interface is operational; and
    releasing by the syndication provider apparatus the programming interface when the determining indicates the programming interface is operational.

3. The method as set forth in claim 1 wherein the obtaining the data further comprises:
    determining by the syndication provider apparatus when data needed to complete the transaction can be retrieved from storage;
    obtaining by the syndication provider apparatus the data determined to be available from the storage; and
    requesting by the syndication provider apparatus any remaining portion of the data needed to complete the transaction.

4. The method as set forth in claim 1 further comprising facilitating by the syndication provider apparatus the distribution of revenue associated with the transaction to the application provider system and the feature provider system using a unique identifier included in the implementation of the programming interface and received upon completion of the transaction.

5. The method as set forth in claim 1 further comprising notifying by the syndication provider apparatus the application provider system when the one or more features are available for selection.

6. The method as set forth in claim 1 wherein the generating the implementation of the programming interface further comprises:
    obtaining by the syndication provider apparatus at least a workflow for the application; and
    obtaining by the syndication provider apparatus at least a definition of a user interface for the application, wherein the generating the implementation of the programming interface is based on the obtained workflow and the obtained definition of the user interface.

7. A non-transitory computer readable medium having stored thereon instructions for integrating and managing one or more features in an application comprising executable code which when executed by at least one processor, causes the processor to perform steps comprising:
    obtaining application data from at least one application provider system with at least one application and feature data from at least one feature provider system with a plurality of features, the application data comprising a type of service provided to a user of the application, a number of users of the application, or a branding of the application, and the feature data comprising at least integration preference data;
    determining when to approve an integration request received from the application provider system based on the obtained application data and integration preference data;
    providing to the application provider system a list of one or more of the features and receiving a selection of one of the features for integration with the application when the integration request is determined to be approved;
    generating an implementation of a programming interface between the application and the one feature to be integrated in the application, wherein the implementation comprises content that can be integrated in and displayed by the application and the content facilitates a transaction and comprises one or more user interface-related features defined by an eXtensible Markup Language (XML) template; and providing the generated implementation of the programming interface to the application provider system.

8. The medium as set forth in claim 7 further having stored thereon at least one additional instruction comprising executable code which when executed by the processor, causes the processor to perform at least one additional step comprising:
performing one or more test transactions to determine when the programming interface is operational; and
releasing the programming interface when the determining indicates the programming interface is operational.

9. The medium as set forth in claim 7 wherein the obtaining the data further comprises:
determining by the syndication provider apparatus when data needed to complete the transaction can be retrieved from storage;
obtaining by the syndication provider apparatus the data determined to be available from the storage; and
requesting by the syndication provider apparatus any remaining portion of the data needed to complete the transaction.

10. The medium as set forth in claim 7 further comprising facilitating the distribution of revenue associated with the transaction to the application provider system and the feature provider system using a unique identifier included in the implementation of the programming interface and received upon completion of the transaction.

11. The medium as set forth in claim 7 further having stored thereon at least one additional instruction comprising executable code which when executed by the processor, causes the processor to perform at least one additional step comprising notifying the application provider system when the one or more features are available for selection.

12. The medium as set forth in claim 7 wherein the generating the implementation of the programming interface further comprises:
obtaining at least a workflow for the application; and
obtaining at least a definition of a user interface for the application, wherein the generating the implementation of the programming interface is based on the obtained workflow and the obtained definition of the user interface.

13. A syndication provider apparatus comprising a processor and a memory coupled to the processor which is configured to be capable of executing programmed instructions comprising and stored in the memory to:
obtain application data from at least one application provider system with at least one application and feature data from at least one feature provider system with a plurality of features, the application data comprising a type of service provided to a user of the application, a number of users of the application, or a branding of the application, and the feature data comprising at least integration preference data;
determine when to approve an integration request received from the application provider system based on the obtained application data and integration preference data;
provide to the application provider system a list of one or more of the features and receiving a selection of one of the features for integration with the application when the integration request is determined to be approved;
generate an implementation of a programming interface between the application and the one feature to be integrated in the application, wherein the implementation comprises content that can be integrated in and displayed by the application and the content facilitates a transaction and comprises one or more user interface-related features defined by an eXtensible Markup Language (XML) template; and
provide the generated implementation of the programming interface to the application provider system.

14. The apparatus as set forth in claim 13 wherein the processor is further configured to be capable of executing at least one additional programmed instruction comprising and stored in the memory to:
perform one or more test transactions to determine when the programming interface is operational; and
release the programming interface when the determining indicates the programming interface is operational.

15. The apparatus as set forth in claim 13 wherein the processor is further configured to be capable of executing at least one additional programmed instruction comprising and stored in the memory to:
determine by the syndication provider apparatus when data needed to complete the transaction can be retrieved from storage;
obtain by the syndication provider apparatus the data determined to be available from the storage; and
request by the syndication provider apparatus any remaining portion of the data needed to complete the transaction.

16. The apparatus as set forth in claim 13 wherein the processor is further configured to be capable of executing at least one additional programmed instruction comprising and stored in the memory to facilitate the distribution of revenue associated with the transaction to the application provider system and the feature provider system using a unique identifier included in the implementation of the programming interface and received upon completion of the transaction.

17. The apparatus as set forth in claim 13 wherein the processor is further configured to be capable of executing at least one additional programmed instruction comprising and stored in the memory to notify the application provider system when the one or more features are available for selection.

18. The apparatus as set forth in claim 13 wherein the processor is further configured to be capable of executing at least one additional programmed instruction comprising and stored in the memory to:
obtain at least a workflow for the application; and
obtain at least a definition of a user interface for the application, wherein the generating the implementation of the programming interface is based on the obtained workflow and the obtained definition of the user interface.

* * * * *